US008209349B2

(12) United States Patent
Howes et al.

(10) Patent No.: US 8,209,349 B2
(45) Date of Patent: Jun. 26, 2012

(54) INTEGRATED SAVED SEARCH RESULTS

(75) Inventors: Timothy Howes, Los Altos, CA (US); Eric Vishria, San Carlos, CA (US)

(73) Assignee: RockMelt, Inc., Mountain View, CA (US)

( * ) Notice: Subject to any disclaimer, the term of this patent is extended or adjusted under 35 U.S.C. 154(b) by 223 days.

(21) Appl. No.: 12/698,064

(22) Filed: Feb. 1, 2010

(65) Prior Publication Data

US 2011/0191314 A1 Aug. 4, 2011

(51) Int. Cl.
*G06F 17/30* (2006.01)

(52) U.S. Cl. ........................................ 707/769; 707/773

(58) Field of Classification Search .................. 707/769, 707/773

See application file for complete search history.

(56) References Cited

U.S. PATENT DOCUMENTS

| | | | | |
|---|---|---|---|---|
| 6,594,654 | B1 | 7/2003 | Salam et al. | |
| 2004/0210560 | A1 | 10/2004 | Shuster | |
| 2009/0006358 | A1 * | 1/2009 | Morris et al. | 707/5 |
| 2009/0119599 | A1 * | 5/2009 | Hazen | 715/738 |

OTHER PUBLICATIONS

PCT International Search Report and Written Opinion, PCT Application No. PCT/US10/59131, Feb. 2, 2011, 11 pages.

"Google Alerts FAQ—Alerts Help," Google, 2010, 4 pages, [Online] [Retrieved on Apr. 20, 2010] Retrieved from the Internet<URL:http://www.google.com/support/alerts/bin/answer.py?hl=en&answer=71057>.

* cited by examiner

*Primary Examiner* — Hung Q Pham

(74) *Attorney, Agent, or Firm* — Fenwick & West LLP

(57) ABSTRACT

To provide an improved user experience for users of a web browser, embodiments of the invention save queries entered by a user via the web browser. The queries may be for execution on different network search services, such as search engines, social networks, message posting services, and the like. At various times in the future, the web browser then executes the saved search queries on their corresponding network search services, identifies search results that are new and highly relevant to the user, and provides the identified search results to the user.

22 Claims, 5 Drawing Sheets

Save query
410

Wait for time period
420

Execute saved query
430

Obtain search results
440

Identify new / highly relevant results
450

Provide identified results to client
460

INTEGRATED SAVED SEARCH RESULTS

CROSS REFERENCE TO RELATED APPLICATIONS

This application is related to application Ser. No. 12/687,012, filed on Jan. 13, 2010, which is incorporated herein by reference.

BACKGROUND

The present invention generally relates to the field of software systems, and more specifically, to techniques for saving user search queries and providing updated search results based on the saved queries.

Users frequently re-execute the same Internet search queries that they have executed in the past. Query re-execution is useful not only as a way to find a desired search result that a user recalls seeing before, but is also useful for tracking changes in information on a particular topic. As one example, users are frequently interested in finding references to themselves, so they may use their web browsers to enter their own names and any additional identifying information (such as their professions) as a query to be executed by a network search engine. By repeating the same query at later times, they can check to see if there has been any additional information provided about them.

However, conventional browsers fail to provide assistance for repeated querying, instead requiring the user to remember to re-execute the query (e.g., entering his or her name), as well as to remember the exact terms that made up the query, and to re-enter each of those terms. This is particularly problematic in the case of lengthy or complex search queries. Further, once the search results have been returned in response to query execution, conventional browsers fail to aid the user in distinguishing the new search results that were not present in sets of search results obtained on prior occasions or in pointing out search results of particular relevance to the user.

SUMMARY

To provide an improved user experience for users of a web browser, embodiments of the invention save queries entered by a user via the web browser. The queries may be for execution on different network search services, such as search engines, social networks, message posting services, and the like. At various times in the future, the web browser then executes the saved search queries on their corresponding network search services and provides updated results to the user.

In one embodiment, the saved query is repeatedly executed at later times, such as at fixed periodic intervals, or at intervals whose lengths are determined based on amounts of change between the search results obtained from executions of the queries over time. As one example of the latter, the length of the period before the next query re-execution can be made shorter if the search results obtained from the last execution of the saved query are significantly different from the search results obtained from the execution prior to that, or longer if the difference is not significant.

When the saved query is re-executed at a later time, the corresponding set of search results is compared to a prior set of search results, and the search results that are new and highly relevant are identified and provided to a user, either by themselves, or as part of a search result set that includes search results that are not new and/or not highly relevant.

In one embodiment, in order to identify whether a search result is highly relevant, a degree of relevance of the search result is determined based at least in part on information associated with the search result set provided by the network search service, such as a rank or score provided by a search engine, a message posting time provided by a message posting service, or the like. Ranks or scores provided by the network search service may also be adjusted—such as based on interactions of the user (or of the user's friends on a social networking site) with content associated with the search results—before determining the degree of relevance of the search result.

In one embodiment, the query is saved in response to an explicit user request to save the query, such as by selecting a "Save this query" button or other element in a user interface. In other embodiments, the query is automatically saved without an explicit request from the user to save the search query, or is saved semi-automatically (e.g., based on user confirmation of an automatic suggestion to save the query).

In one embodiment, saving and re-execution of the query are performed on a saved search server that handles saved query execution on behalf of a client. In another embodiment, the saving and re-execution are performed on the client itself.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
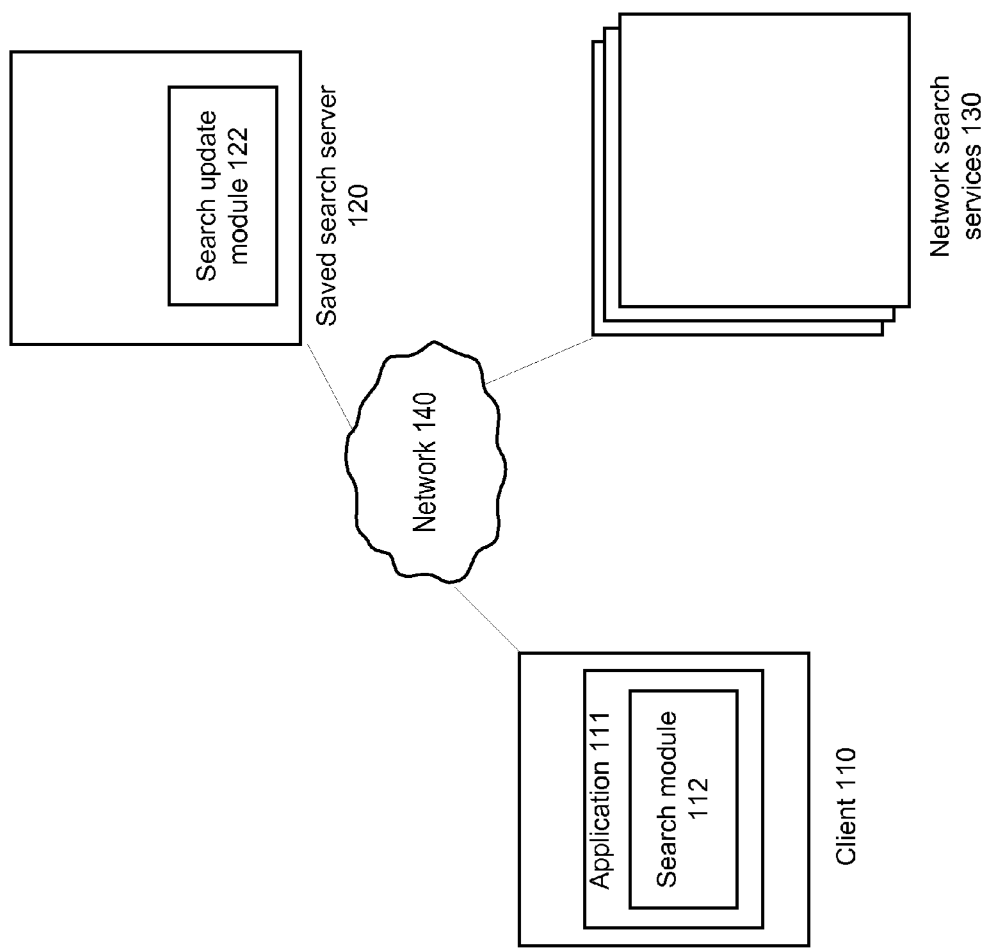
FIG. 1 is a high-level block diagram of a computing environment according to one embodiment.

FIG. 1 is a high-level block diagram of a computing environment 100 according to one embodiment. FIG. 1 illustrates a client 110, a saved search server 120, and one or more network search services 130 connected by a network 140. A user of the client 110 uses an application 111, such as a web browser, that can communicate with the saved search server 120 and/or with the network search services 130. The application 111 additionally obtains search results (e.g., document links, feed articles, social networking content items, or textual messages) from the one or more network search services 130. In some embodiments the application obtains the search results indirectly via the saved search server 120. The application 111 additionally has search module 112—described in more detail below with respect to FIG. 5—that handles saved queries, such as by requesting saving of a query, by updating a user interface of the application 111 to show saved queries and/or new search results for saved queries, and the like.

The network search services 130 provide search results in response to receipt of a search query. For example, a network search service 130 can be: a search engine (e.g., GOOGLE, YAHOO, BING) providing document links to relevant documents in response to execution of the search query against an index; a social networking site (e.g., FACEBOOK, MYSPACE) providing content items such as posts to a user's page on the social network, where the content items have some relationship to the query; a message posting service (e.g., TWITTER) providing textual messages containing terms of (or related to) the search query, and the like.

In one embodiment, the saved search server 120 handles the saving and re-execution of a search query on behalf of the application 111. Using its search update module 122, the saved search server 120 provides new and highly relevant search results to the client 110. A result is considered new with respect to a saved search query if it was not present in a search result set that was previously presented to that user in association with the saved search query. A result is considered highly relevant (equivalently, to have a high degree of relevance) if it has a degree of relevance greater than some threshold value, where the degree of relevance is based at least in part on information associated with the search result provided by the network search service. The saved search server 120 is further described below with respect to FIGS. 3 and 4.

In the embodiment of FIG. 1 the search update module 122 is depicted as residing on the saved search server 120. This embodiment frees the client 110 from the need to re-execute the query and to determine whether there are any new and highly-ranked results since the prior query execution, thereby saving the client bandwidth and processing time. In an alternative embodiment, however, the search update module 122 resides on the client 110 itself, and the saved search server 120 need not be used.

For simplicity, FIG. 1 depicts only one client 110 and one saved search server 120, although it is appreciated that there could be any number of each. For example, there could be multiple saved search servers 120 for purposes such as load balancing. Additionally, the client 110 and the saved search server 120 can be communicatively coupled with any number of network search services 130, including only a single network search service. Or, as noted, in an embodiment in which the search update module 122 resides on the client 110, there need not be a saved search server 120.

The network 140 represents the communication pathways between the client 110 and the server 120. In one embodiment, the network 140 uses standard Internet communications technologies and/or protocols. Thus, the network 140 can transmit data using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), the extensible messaging and presence protocol (XMPP), etc. The data exchanged over the network 140 can be represented using technologies and/or formats including the hypertext markup language (HTML), the extensible markup language (XML), JavaScript object notation (JSON), the really simple syndication (RSS) format, etc. In addition, all or some links can be encrypted using conventional encryption technologies such as the secure sockets layer (SSL), transport layer security (TLS), secure HTTP (HTTPS) and/or virtual private networks (VPNs). In another embodiment, the entities can use custom and/or dedicated data communications technologies instead of, or in addition to, the ones described above.

Figure 2:
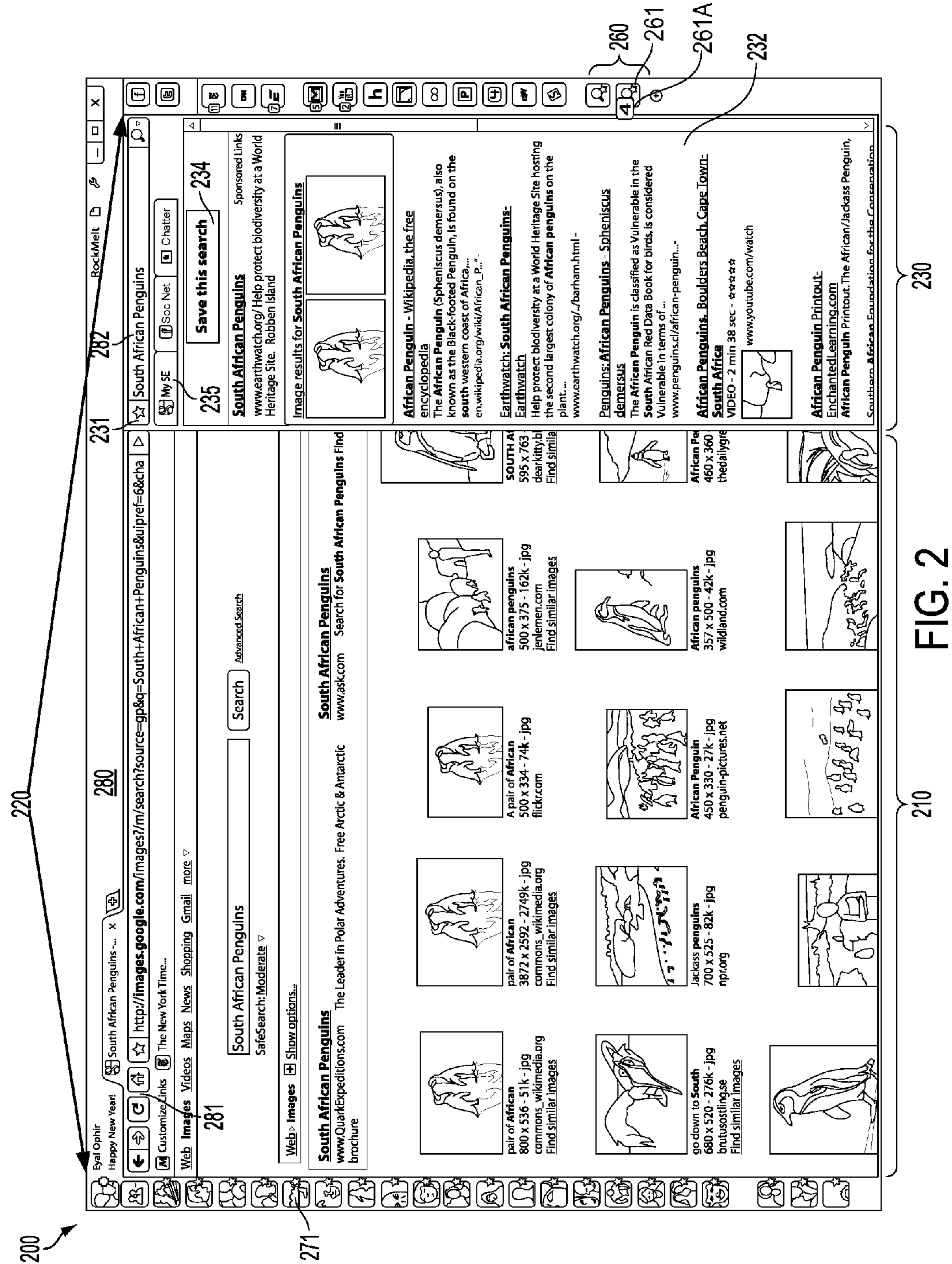
FIG. 2 is a screenshot of an example user interface in a window of a web browser application, according to one embodiment.

FIG. 2 is a screenshot of an example user interface 200 in a window of a web browser application 111 in which embodiments of the present invention operate. The user interface 200 comprises functionality enabling rapid and convenient access to documents, such as web pages, available via a network such as the Internet. More specifically, the user interface 200 comprises a content area 210 configured to display the content of a document. The user interface 200 additionally comprises areas of the browser "chrome" 220, i.e., portions of the browser window, distinct from the content area 210, that are not used to display rendered network-accessible documents. For example, areas of the chrome 220 in the interface of FIG. 2 pertinent to saving queries include a toolbar 280, a search area 230, and saved searches bar 260. The various areas of the chrome 220 may remain visible at the same sizes and locations throughout the operation of the user interface 200, or they may be resized, hidden, or displayed in response to user actions. The functionalities of the various areas other areas of the user interface 200 are described in application Ser. No. 12/687,012.

The toolbar 280 comprises browser controls area 281, which includes conventional browser controls such as forward and back buttons for moving forward and backward in the browser history, a reload button for refreshing the currently displayed document, a home button for causing the content area 210 to display a default document, a URL entry area for specifying a document to be displayed, a favorites list containing shortcuts to particular documents, and the like. The toolbar 280 further comprises a query entry area 282, in which a user can specify a query, e.g., by entering textual query terms.

The search area 230 displays a set of search results 232. In one embodiment, the search area 230 additionally comprises a user interface element 234—such as a button or link—causing the current search query (e.g., the text from the query entry area 282) to be added to the saved searches area 260. In one embodiment, the search area 230 is initially not displayed within the user interface 200, but instead appears in response to execution of a query specified in the query entry area 282 and may be hidden again at a later point in time (e.g., explicitly by selecting a close box 231, or implicitly by selecting one of the search results 232 for display within the content area 210). In one embodiment, the size of the search area 230 varies according to the number of search results, e.g., with the search area's height increasing for greater numbers of search results up to some maximum size (e.g., the height of the browser window, or the height of the screen), after which a scroll bar is displayed for viewing the remaining search results not visible in the available area.

In the embodiment of FIG. 2, the search results 232 are obtained from multiple network search services 130, the browser submitting the search query entered into the query entry area 282 to each network search service 130 and aggregating the results obtained therefrom. Thus, a search result 232 can have various forms, according to the particular network search service 130 that produced it. For example, a search result 232 produced by a search engine such as GOOGLE in response to the search query could comprise a document link to a document that is relevant to the search query, along with descriptive text related to the link and/or the query. Similarly, a search result 232 produced by a social networking site could be a content item, such as a post having text and graphics, to a user's account on the social networking site, where the posting has some relevance to the search query, such as query terms appearing in text of the content item. Or, a search result 232 produced by a message posting service, such as TWITTER, could be a textual message, e.g. one that contains the query terms.

In one embodiment, the set of network search services 130 that are queried is fixed. In other embodiments, the set may be specified by a user, e.g., by altering a configuration file or by specifying the sources in a user interface of the browser. In FIG. 2, the aggregated results are grouped using a set of tabs 235, each tab corresponding to one of the network search services 130, such that selecting one of the tabs (e.g., by clicking on it) displays only the search results obtained from the corresponding network search service. In FIG. 2, there are depicted three tabs corresponding to three hypothetical network search services: a search engine "My SE," a social network "Soc Net," and a blogging service "Chatter." The "My SE" tab is currently selected, and thus the search results 232 displayed are those obtained from the corresponding network search service. In other embodiments, the search results 232 may be displayed in other groupings, such as interspersed in a single search results list sorted according to relevance scores, each search result displaying an associated indication of its source network search service 130 (e.g., the text "Soc Net" for the social networking network search service), or as a set of groups sequentially displayed, each under a heading containing an associated indication of the source network search service.

In one embodiment, the search results 232 are arranged in an order different from that given by the network search service 130 from which they came, based on criteria such as activity on a social networking site. For example, if a user, or the user's friends, on a social networking site have shared a uniform resource locator (URL), or a textual message from a message posting service, with each other on the social networking site, then search results for that URL or textual message can be ranked more highly within the search results than they would otherwise be ranked by a search engine. This leverages the considerable additional information about the user provided by the social networking site to present the search results 232 in an order more relevant to the user.

Another criterion used to rank search results 232 in an order different from that of the network search service 130 from which they came is the frequency of occurrence of URLs in a discussion stream, such as that provided by a message posting service such as TWITTER. As one specific example, when a user enters a query the textual messages from the message posting service associated with the query are obtained, the URLs included in those textual messages are extracted (and normalized using URL-expansion functionality of a URL-shortening service, if they are in shortened form), and the most frequent of the resulting URLs are identified. These URLs are then considered of particular importance, and a search result corresponding to one of those URLs is ranked more highly than it would otherwise be ranked.

In one embodiment, a search result 232 may comprise one or more user interface elements, such as clickable links located adjacent to the search result, corresponding to actions that can be taken on content of the search result. The possible actions can be based on the type of the search result, or on the entity providing the data of the search result, for instance. For example, any search result could have a "Share" action causing the associated data to be shared on a particular social networking site, e.g., posting a search result referencing a video to an account of the user on the social networking site. As another example, a search result representing an item posted on a social networking site could have a "Comment" action allowing the user to enter a comment on the item, or a "Like" action allowing the user to specify approval of the item. As a further example, a search result representing a text message, such as a message from a message posting service, could have a "Resend" action that sends a message to all of the user's subscribers, or a "Reply" action that sends the message directly and only to the poster of the original message.

In one embodiment, the actions associated with a search result are accomplished by invoking a method of an API of a web site or application in which the action is to be taken (the API being implemented as, e.g., a web service). For example, the "Share" action for data associated with a search result can be performed by invoking an item-posting API function of the social networking site on which the data is to be shared.

The saved searches area 260 displays a set of saved searches that are re-executed at various times. In one embodiment, each saved search is depicted with a visual representation 261 in the saved searches area 260, such as the depicted magnifying glass graphic indicating a saved search. In one embodiment, an action such as hovering the mouse cursor over the visual representation 261 displays the associated query text (e.g., "South African penguins"). A visual representation might also be a graphic, such as a logo of a network search service 130 to which the query is submitted, an arbitrary user-assigned graphic, or a portion of the associated query text. A user might manually save a search query, e.g. by clicking the "Save this search" user interface element 234 that appears in association with the search results area 230. Alternatively, a search query might be automatically or semi-automatically saved. For example, logic within the browser (such as the search module 112) could note that the user frequently enters that search query, or a substantial number of terms of that search query, and accordingly save the search query, or request the user's permission to do so.

In one embodiment, when execution of a saved search query results in new and highly relevant search results, a visual indicator is placed on, or otherwise in visual association with, the visual representation 261 to denote that new search results are available for viewing. In FIG. 2, for example, the visual indicator 261A is depicted as a number (e.g., 4, representing four new search results since the last time that the user viewed the results of the search query) that is overlaid on the visual representation 261, but it could equally be any other image, effect, animation, or the like associated with the icon, such as a star image, a highlight, a blinking background, etc.

The new and relevant results of a saved search can be presented in different manners in different embodiments. For example, in one embodiment selecting the visual representation 261 (e.g., via a mouse click) causes display of the search results area 230. The search results 232 may include only the search results that are new with respect to the last time that search results for the saved search query were presented, or they may include all search results, with the new results specially depicted, such as listed before non-new search results, and/or shown with highlighting, for example. In another embodiment, the new and relevant search results are presented in a separate window from the main user interface window 200, such as a window docked inside or outside of the main user interface window, or a separate floating window.

It is appreciated that the saved searches area 260 need not be located in the right-hand side of the chrome 220 of the browser 111, nor need it even appear in the chrome at all. It could appear, for example, in a floating window separate from the main browser window, within a dialog box accessible via a menu, within a drop-down selection list, and the like. Additionally, not all the saved searches need be shown at once within the saved searches area 260. For example, only a subset of the saved searches could be visually represented at any given time, with the remainder available by scrolling. In some embodiments, some saved searches—e.g., very old saved searches—do not have a visual representation within the saved searches area 260 at all. In one embodiment, the search module 112 removes a visual representation of a saved query from the saved searches area 260, or prompts a user to confirm the removal, in response to the user not having selected the visual representation for some period of time, or the saved query not having generated any new and relevant results for some period of time.

It is appreciated that the user interface 200 is purely for purposes of example, and that other user interface configurations could equally be employed. The various areas of the chrome 220, for example, could be displayed in different locations of the user interface 200, such as along the bottom edge, or as individual floating windows or toolbars separately movable from the main browser window (e.g., after being "torn off" from the main window by the user). The user interface 200 need not comprise all the components described above, and/or it may comprise additional components not described. The various components may also be merged and/or separated in manners different from those described above; for example, the query entry area 282 could be located within the search area 230, rather than within the toolbar 280.

Figure 3:
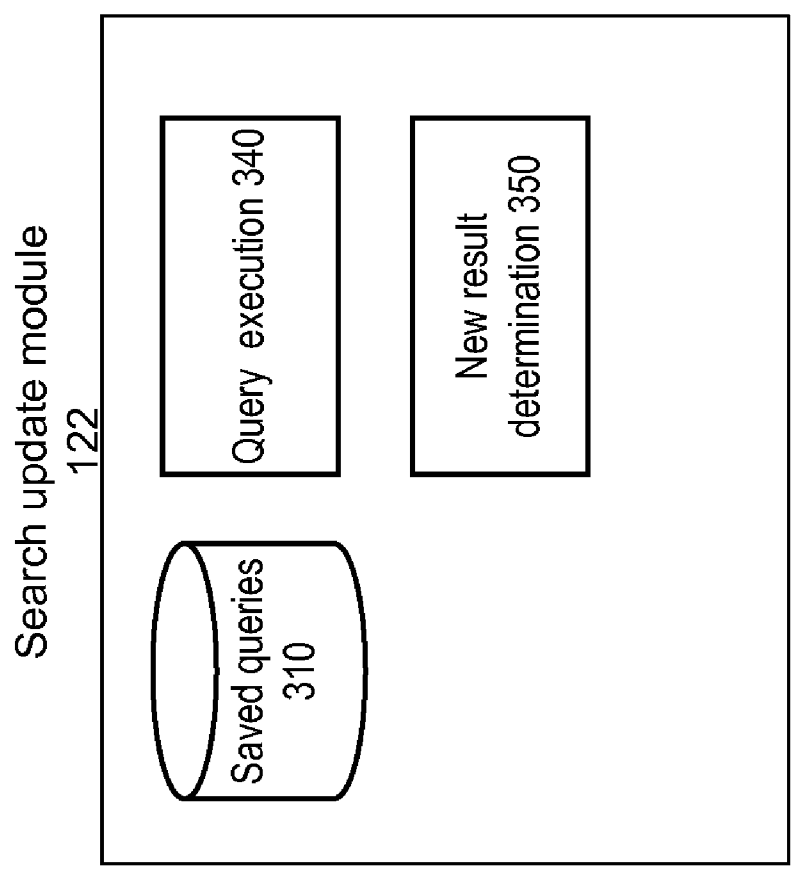
FIG. 3 is a block diagram of a search update module to save queries and provide a client with updated search results, according to one embodiment.
Figure 4:
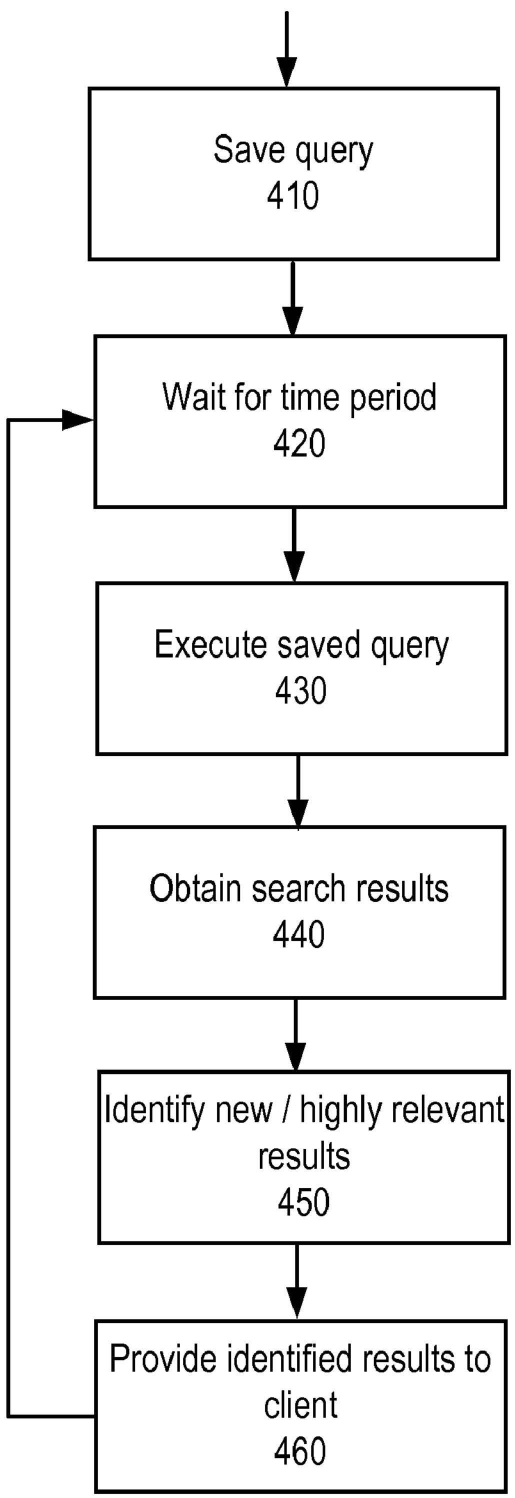
FIG. 4 is a flowchart of a process for providing updated search results based on a saved search query, according to one embodiment.
Figure 5:
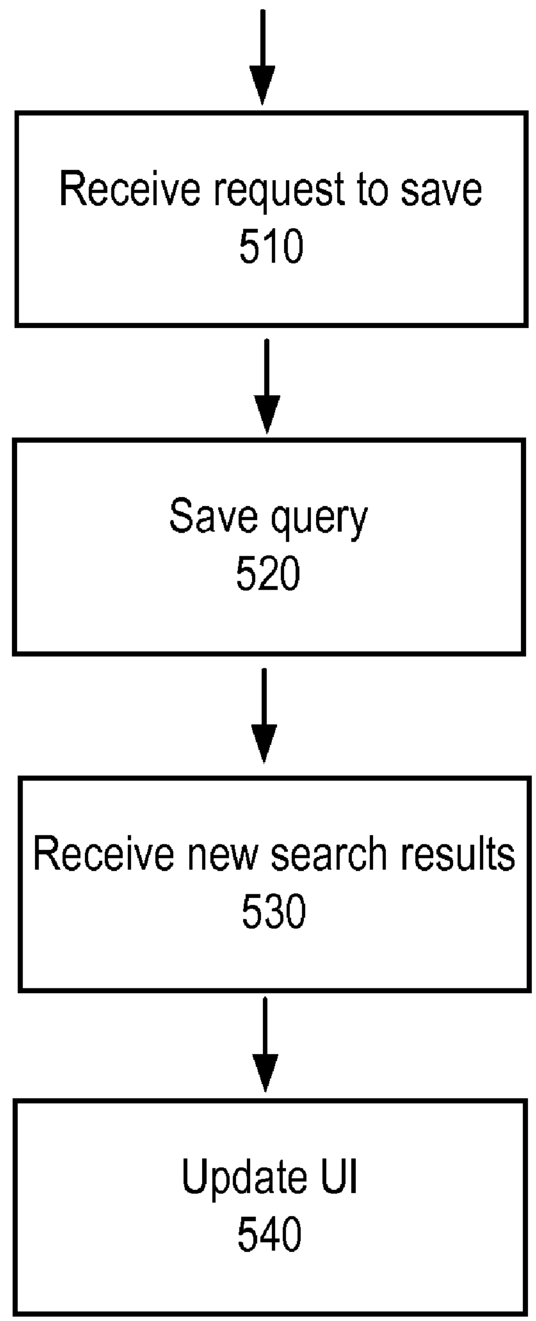
FIG. 5 is a flowchart of a process performed by a client for displaying updated search results based on a saved search query, according to one embodiment.

FIGS. 3-5 depict the server-side and client-side components and actions used to implement the saved search functionality referenced above.

FIG. 3 displays components of the search update module 122 used to save queries and provide the client 110 with updated search results, according to one embodiment. The search update module 122 comprises a saved queries repository 310 that stores a prior search query in association with one or more prior result sets resulting from execution of the query. The search query may additionally be associated with other information, such as one or more users on behalf of whom the query was executed (so that the search update module 122, if implemented on the saved search server 120, will have a recipient to which to deliver new search results), the last time or times of query execution and/or a time to wait until executing the query again, and/or identifiers of a set of network search services 130 on which the query should be executed. A query may be associated with more than one user if the search update module 122 determines that multiple users have submitted the same query, thereby allowing results to be obtained for multiple query requests using a single query. The saved queries repository 310 may be implemented in different ways in different embodiments, e.g., as a table or tables of a conventional relational database management system.

The search update module 122 further comprises a query execution module 340, which submits the queries stored in the saved queries repository 310 to the appropriate network search service(s) 130 for execution. In one embodiment, each query is submitted to a fixed set of network search services 130; in another embodiment, it is submitted to different network search services on a per query basis, as specified by information stored in association with the query in the saved queries repository 310. The query execution module 340 further receives the search results from the network search service(s) 130.

The search update module 122 further comprises a new result determination module 350 that identifies the new and highly relevant search results from the search results obtained by the query execution module 340. As noted previously, a result is considered new with respect to a saved search query if it was not present in a search result set that was previously presented to that user in association with the saved search query, and is considered to have a high degree of relevance if it has a degree of relevance greater than some threshold value, where the degree of relevance is based at least in part on information associated with the search result set. In one embodiment, the new search results for a query are identified by comparing the latest search results to the prior sets of search results stored in the saved queries repository 320 for that search query, with a search result being considered new if it is not present in any of the prior sets.

In one embodiment, the information associated with the search result set upon which the degree of relevance is based is a rank of the search result based on the inherent order of search results of the network search service 130 from which the search result set came. For example, the search results from a traditional search engine are typically ordered according to some ranking quantifying a match strength between the query terms and the content of the document linked to by the search result, and the search results from a message posting service (e.g., TWITTER) are ranked in order of recency. Thus, the first search result as returned by these network search services 130 could be considered to have the highest rank, the second search result the second highest rank, and so forth. A custom ranking algorithm can also be employed by an entity such as the saved search server 120, or by the application 111 itself. This custom ranking may modify the ranking of the source network search service 130 based on additional data not known to the network search service. For example, the custom ranking could promote or demote search results in a search result set provided by the network search service based on content associated with the user on a social networking site, e.g., promoting search results having text frequently found in postings of the user on a social networking site. Search results having rankings in the top N (for some integer N), or search results with a sufficiently high relevance score, can then be selected as being highly relevant, for example. Thus, the new result determination module 350 produces, as its output, search results that are both new and highly-ranked.

FIG. 4 is a flowchart of a process for providing updated search results based on a saved search query, according to one embodiment. The search update module 122 saves 410 a query in the saved queries repository 310 in response to receiving a request to save the query for re-execution. For example, in embodiments in which the search update module 122 is implemented on the saved search server 120, the client 110 might submit such a request to the saved search server in response to the user selecting the user interface element 234 of FIG. 2.

The search update module 122 then waits 420 for some period of time before executing the query. In one embodiment, the period of time is a fixed predetermined time representing a periodic interval, such as 12 hours, and does not vary between subsequent executions of the query. In another embodiment, the period of time varies based on prior search results. For example, the period of time can be a "backoff" time that is made shorter if the search results obtained from the last execution of the saved query are significantly different from the search results obtained from the execution prior to that. The degree of the difference could be measured, for example, by how many of the search results were not present in the prior set of the search results, with a greater number of new results indicating a greater degree of change and thus causing the period of time between queries to be shorter. In some embodiments, period of time could be defined implicitly based on the occurrence of certain events, such as the restarting of the client 110 or the application 111. For example, the search update module 122 could wait to re-execute the saved search query until the browser application 111 launches or until a given time interval elapses.

After the period of time has elapsed, the search update module 122 then executes 430 the saved query by submitting the query to the one or more network search services 130 with which it is associated. In response, the search update module 122 obtains 440 a set of search results from each of the one or more network search services 130. The search update module 122 may also update the results data associated with the query in the saved queries repository 310 to reflect this latest set of search results.

The search update module 122 identifies 450 the new and highly-ranked results from the results obtained at step 440, as described above with respect to the new result determination module 350 of FIG. 3. The search update module 122 then provides 460 the identified results (if any), e.g., to the client 110, optionally along with search results that are not new and/or not highly relevant, and returns to step 420 in preparation for another iteration of query execution.

FIG. 5 is a flowchart of a process performed by a client for displaying updated search results based on a saved search query, according to one embodiment. The search module 112 first receives 510 a request to save a search query for later re-execution, such as a selection of the user interface element 234 of FIG. 2 after execution of the search query. In response, the search module 112 causes 520 the query to be saved. In an embodiment such as that of FIG. 1, in which the search update module 122 is located on the saved search server 120 rather than on the client 110, this involves sending a request to the search update module 122 over the network 140.

With the query saved, at some later point in time (e.g., after expiration of the time period described above with respect to FIG. 4), the search module 112 receives 530 new and highly relevant search results in response to re-execution of the search query. The search module 112 then updates 540 a user interface of the client 110—such as the user interface 200 depicted in FIG. 2—with the received search results. For example, this could comprise associating a visual indicator 261A with a visual representation 261 for the saved search, as described above with respect to FIG. 2, and displaying the search results in the search area 230 in response to a user selecting the icon 261. Then, when the user selects the icon 261, the new and highly relevant search results can be displayed in the search area 230, in a separate window, or the like. If search results from the last search result set that are not new and/or not highly relevant are also displayed, the new and highly relevant search results are visually distinguished from the others, e.g. by highlighting, by displaying them in a group before the others, etc.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification, such as the client 110 and the saved search server 120, may include a single processor or may be architectures employing multiple processor designs for increased computing capability. The computers include conventional components such as secondary storage devices (e.g., hard disks), primary storage (e.g., main memory such as RAM), network access hardware (e.g. network interface cards), and the like.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for providing new results for a search query, comprising:

receiving a search query from a user operating a local client device;

saving the search query in a persistent storage medium on the local client device;

transmitting the saved search query from a browser application on the local client device to a network search service;

receiving a first search result set from the network search service based on the search query;

displaying at least a portion of the search result set to the user;

automatically retransmitting the saved search query from the browser application on the local client device to the network search service to obtain an updated search result set;

identifying search results of the updated search result set that were not present in the first search result set;

displaying at least the identified search results to the user;

determining a count of the search results of the updated search result set that were not present in the first search result set;

computing a search backoff time based at least in part on the count; and waiting the computed search backoff time before retransmitting the saved search query to the network search service.

2. The computer-implemented method of claim 1, further comprising identifying, within the identified search results, a search result having a high degree of relevance, based at least in part on information associated with the search result and provided by the network search service.

3. The computer-implemented method of claim 2, wherein the network search service is a search engine, and wherein identifying the search result having the high degree of relevance is based at least in part on a relevance score provided by the search engine for the search result.

4. The computer-implemented method of claim 2, wherein the network search service is a message posting service and the search result having the high degree of relevance is a message, and wherein identifying the search result having the high degree of relevance is based at least in part on a time corresponding to a posting of the message.

5. The computer-implemented method of claim 2, wherein the network search service is a social network and the search result having the high degree of relevance is a content item on the social network, and wherein identifying the search result having the high degree of relevance is based at least in part on activity on the social network.

6. The computer-implemented method of claim 5, wherein the content item is a posting to a page of a user on the social network, and wherein identifying the search result having the high degree of relevance is based at least in part on amounts of sharing of the posting.

7. The computer-implemented method of claim 1, further comprising:

transmitting the saved search query to a second network search service to obtain a second search result set; and providing the first search result set and the second search result set to a client device of the user for display in a client user interface.

8. The computer-implemented method of claim 1, wherein the search query is saved without an explicit request from the user to save the search query.

9. The computer-implemented method of claim 1, wherein at least one search result of the search result set comprises a user interface element corresponding to an action to be taken on content of the search result by a user selecting the user interface element, the action being based on at least one of a type of the search result and a type of an entity providing data of the search result.

10. The computer-implemented method of claim 9, wherein the action comprises at least one of:

a share action causing the content of the search result be shared on an account of the user on a social networking site;

a comment action allowing the user to enter a comment on the content of the search result;

a resend action that sends a message associated with the content to subscribers of a user on a message sharing service; and a reply action that sends a message associated with the content only to a poster of the message on a message sharing service.

11. The computer-implemented method of claim 1, wherein the computed search backoff time becomes less as the determined count becomes greater.

12. A computer-readable storage medium having executable computer program instructions embodied therein for providing new results for a search query, actions of the computer program instructions comprising:

receiving search queries from users operating local client devices;

saving the search queries in a persistent storage medium on the local client devices;

repeatedly performing the following:

automatically transmitting the saved search queries from browser applications on the local client devices to a plurality of network search services;

receiving search result sets from the network search service in response to the transmissions of the search queries;

identifying search results of the search result sets that were not present in prior search result sets and that have a high degree of relevance;

displaying at least the identified search results to the user;

determining a count of the search results of a previous received search result set that were not in a previous received search result set;

computing a search backoff time based at least in part on the count; and waiting the computed search backoff time before a next transmission of the saved search queries to the plurality of network search services.

13. The computer-readable storage medium of claim 12, the actions of the computer program instructions further comprising transmitting at least one of the saved search queries to multiple ones of the plurality of network search services, thereby obtaining corresponding multiple search result sets for the at least one saved search query, and providing the multiple search result sets to one of the local client devices for display in a client user interface in visual association with the at least one saved search query.

14. A computer-implemented method of receiving new results for a search query, comprising:

providing a user interface in a web browser window of a web browser executing on a local client device, the user interface comprising a content display area for displaying a rendered web page and a chrome area that is separate from the content area;

receiving a search query from a user via the user interface;

receiving a first search result set corresponding to the search query;

saving the search query on the local client device;

transmitting the saved search query to a network search service;

receiving from the network search service, after receipt of the first search result set and responsive to transmitting the saved search query, a second search result set corresponding to the saved search query and comprising new search results that were not present in the first search result set; and displaying the new search results to the user;

determining a count of the new search results;

computing a search backoff time based at least in part on the count; and waiting the computed search backoff time before retransmitting the saved search query to the network search service.

15. The computer-implemented method of claim 14, further comprising receiving the search query within the chrome area and displaying the identified search results within the chrome area.

16. The computer-implemented method of claim 15, wherein the chrome area consists of a substantially rectangular region within the web browser window and having an area less than half of the area of the web browser window, one side of the chrome area joining one of a set of outer edges of the web browser window.

17. The computer-implemented method of claim 14, further comprising displaying to the user both the new search results and other search results of the second search result set, wherein the new search results are visually distinguished from the other search results.

18. The computer-implemented method of claim 14, wherein the second search result set does not comprise any search results present in the first search result set.

19. The computer-implemented method of claim 14, further comprising:

displaying a visual representation of the search query in the chrome area; and displaying the new search results to the user responsive to a user selection of the visual representation of the search query.

20. The computer-implemented method of claim 19, further comprising displaying a visual indication of availability of the new search results in association with the visual representation of the search query, responsive at least in part to receiving the new search results.

21. The computer-implemented method of claim 20, wherein the visual representation of the search query comprises an icon located in the chrome area, and the visual indication of availability of the new search results comprises a visual representation of a number corresponding to a number of the new search results.

22. The computer-implemented method of claim 21, further comprising displaying the new search results responsive to user selection of the visual representation of the search query.

* * * * *